(12) United States Patent
Noritake et al.

(10) Patent No.: US 9,780,515 B2
(45) Date of Patent: Oct. 3, 2017

(54) SHEATH STRUCTURE ASSEMBLY COUPLING METHOD

(71) Applicants: Kensuke Noritake, Takatsuki (JP); Kozo Hirano, Takatsuki (JP)

(72) Inventors: Kensuke Noritake, Takatsuki (JP); Kozo Hirano, Takatsuki (JP)

( * ) Notice: Subject to any disclaimer, the term of this patent is extended or adjusted under 35 U.S.C. 154(b) by 1379 days.

(21) Appl. No.: 13/660,106

(22) Filed: Oct. 25, 2012

(65) Prior Publication Data
US 2016/0165665 A1    Jun. 9, 2016

(51) Int. Cl.
| | | |
|---|---|---|
| H01R 43/20 | (2006.01) | |
| H05B 3/06 | (2006.01) | |
| H01R 43/02 | (2006.01) | |
| H05B 3/04 | (2006.01) | |
| H05B 3/56 | (2006.01) | |
| G01K 1/08 | (2006.01) | |

(52) U.S. Cl.
CPC .............. *H01R 43/20* (2013.01); *G01K 1/08* (2013.01); *H01R 43/02* (2013.01); *H05B 3/04* (2013.01); *H05B 3/06* (2013.01); *H05B 3/56* (2013.01)

(58) Field of Classification Search
CPC .......... H05K 5/0329; H05K 5/03; H05K 5/06; H01H 5/00; G01K 1/08; H01R 43/02; H01R 43/20; H05B 3/04; H05B 3/06; H05B 3/56
See application file for complete search history.

(56) References Cited

U.S. PATENT DOCUMENTS

| | | | | |
|---|---|---|---|---|
| 4,812,670 | A * | 3/1989 | Goulet | B60R 25/045 |
| | | | | 180/283 |
| 5,173,615 | A * | 12/1992 | Grooms | B60R 25/023 |
| | | | | 180/287 |
| 5,793,121 | A * | 8/1998 | Burgess | B60K 28/14 |
| | | | | 180/279 |
| 6,423,902 | B1* | 7/2002 | Babiel | H01R 13/665 |
| | | | | 174/84 R |
| 7,521,817 | B2* | 4/2009 | Gors | B60R 21/0132 |
| | | | | 169/54 |

FOREIGN PATENT DOCUMENTS

JP    2007-220325    8/2007

* cited by examiner

*Primary Examiner* — Carl Arbes
(74) *Attorney, Agent, or Firm* — Kratz, Quintos & Hanson, LLP

(57) ABSTRACT

To provide a sheath structure assembly coupling structure and a sheath structure assembly coupling method, with which excellent workability and a reduction in costs can be achieved; a reduction in the strength of the connection portion or in the electrical connection can be prevented and a uniform and excellent electrical connection can be achieved; with which excellent durability is maintained for a long period even in the usage environment in which a great force such a tension or the like continuously acts; and with which break or a reduction in insulating performance can be avoided.

8 Claims, 8 Drawing Sheets

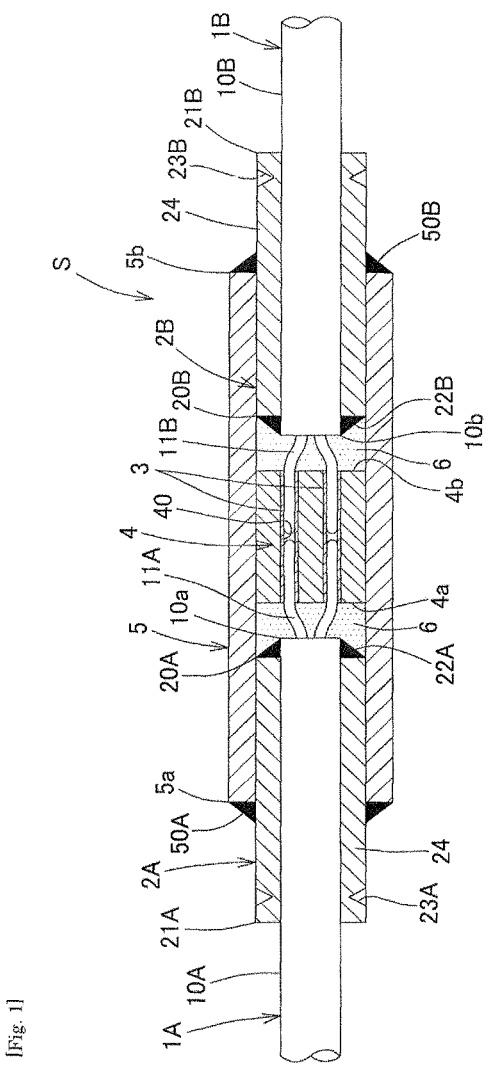
[Fig. 1]

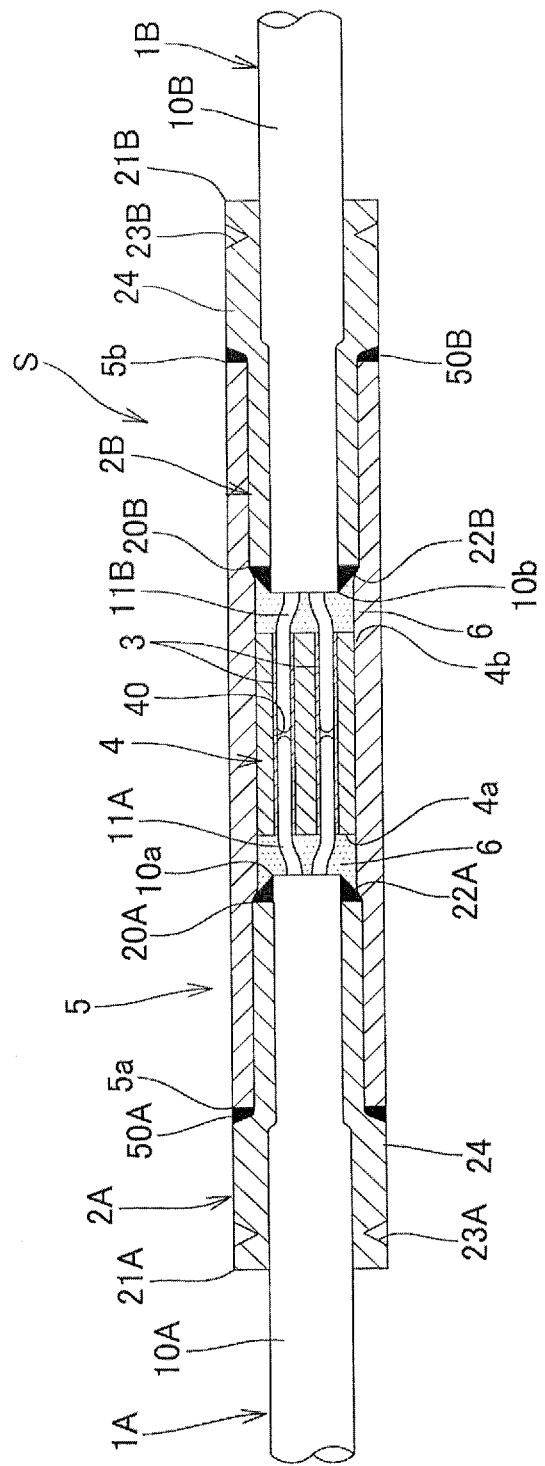
[Fig. 2]

[Fig. 3]
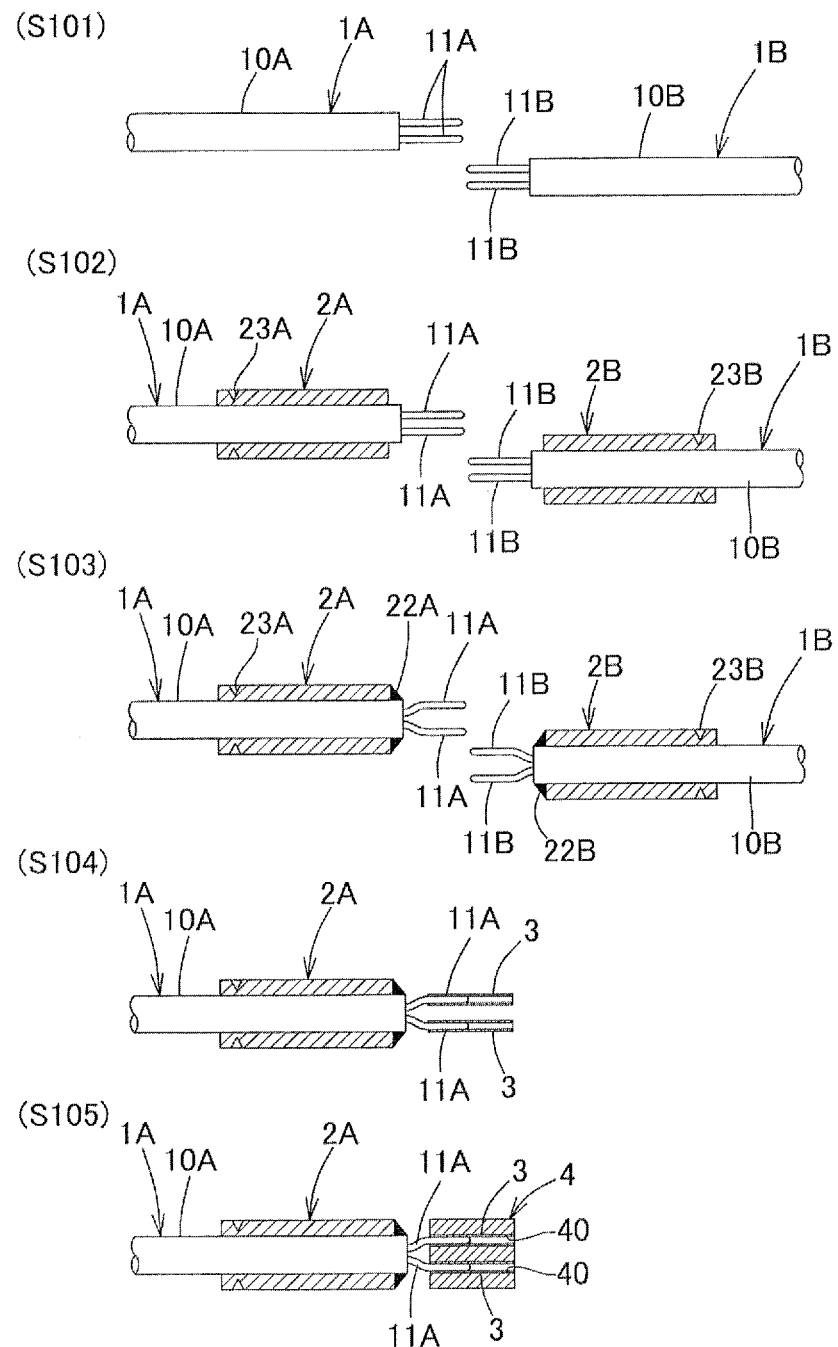

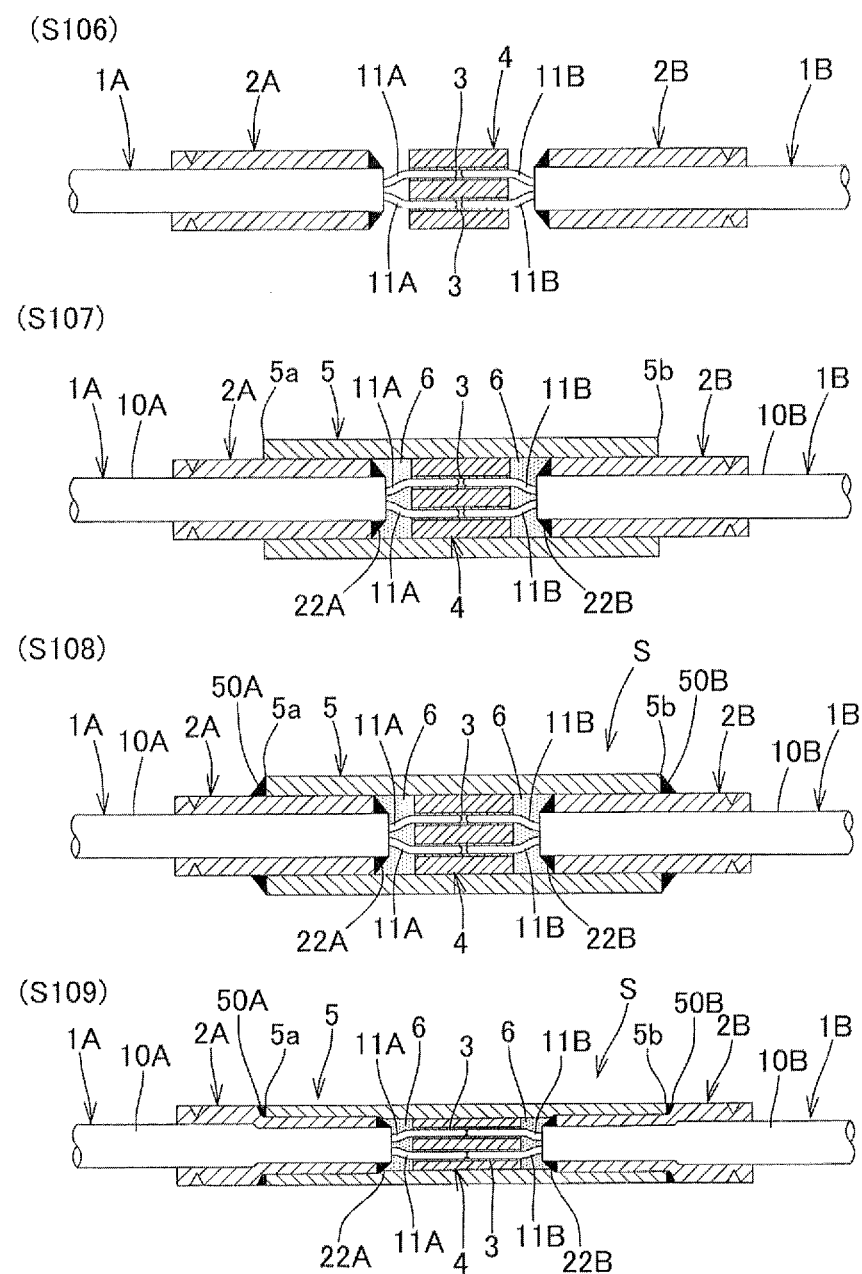

[Fig. 5]
(S201)
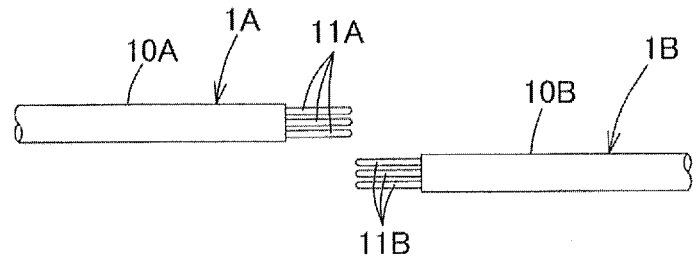
(S202)
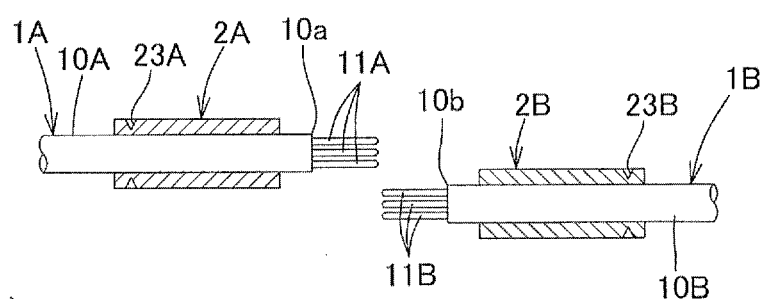
(S203)
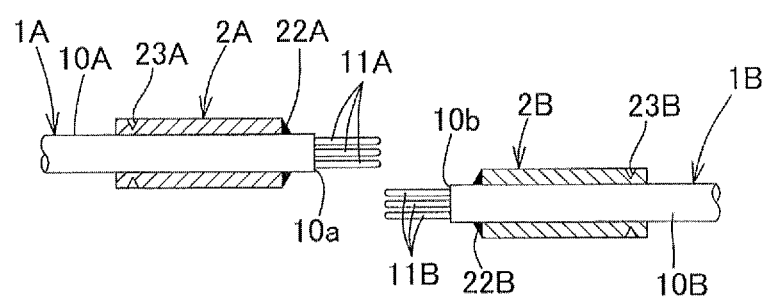
(S204)
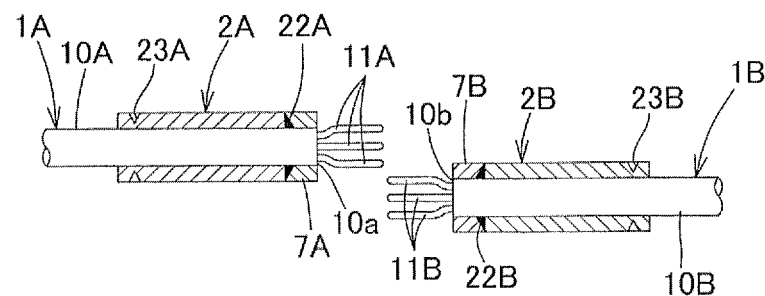

[Fig. 6]
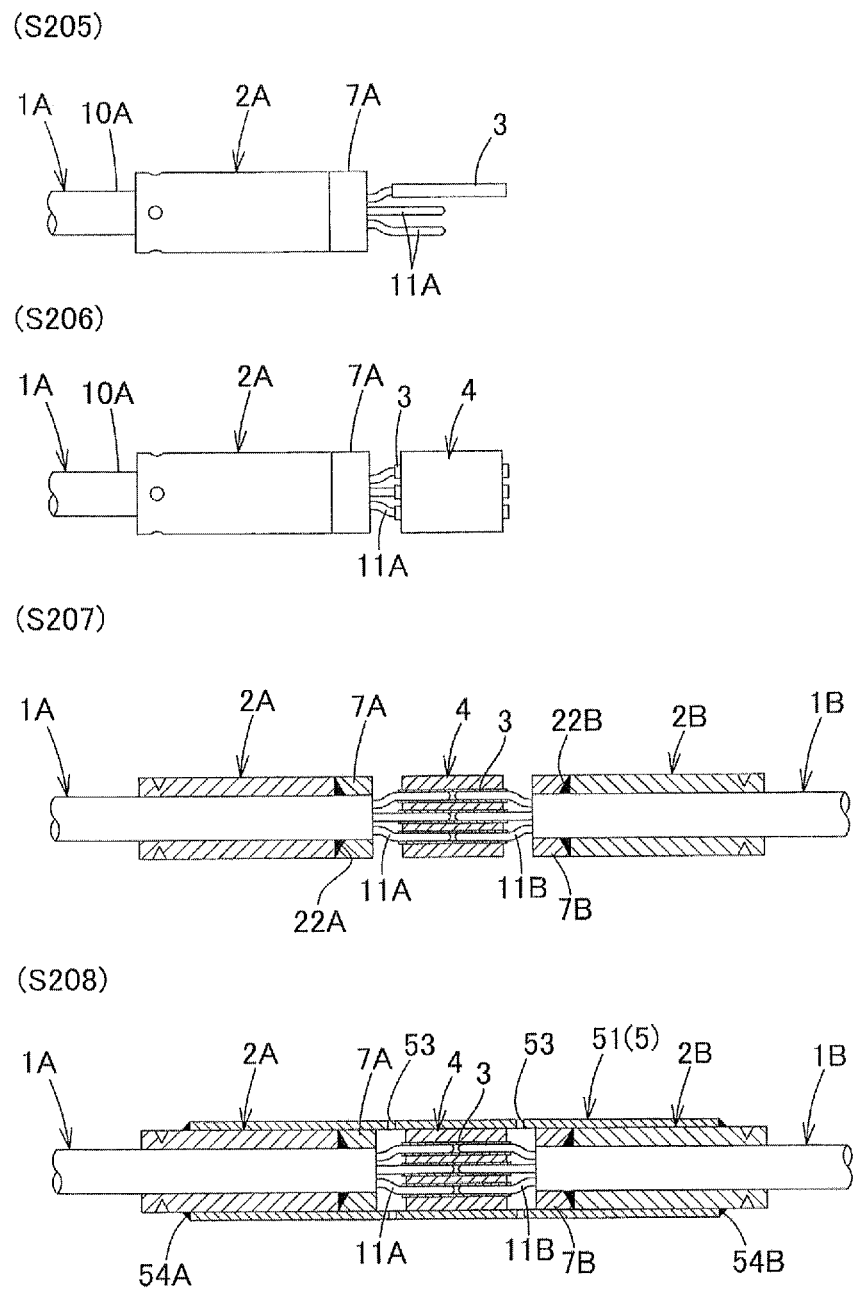

[Fig. 7]
(S209)
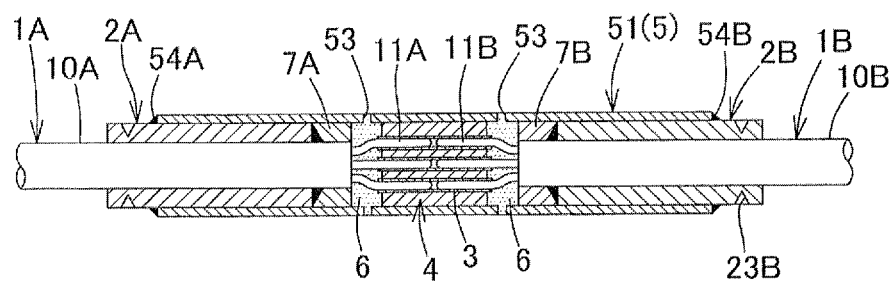
(S210)
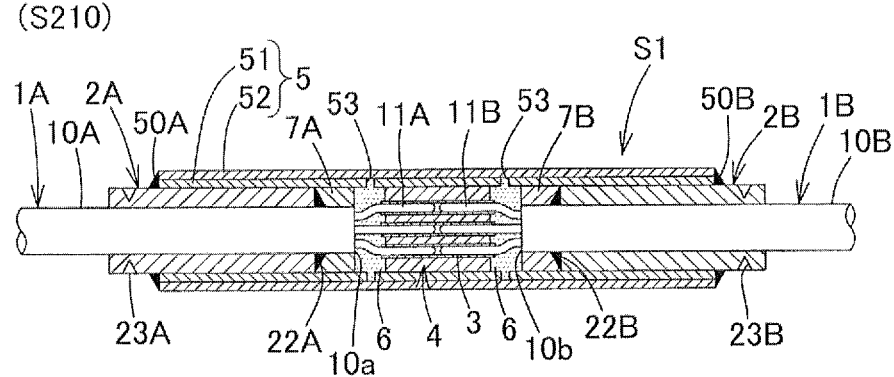
(S211)
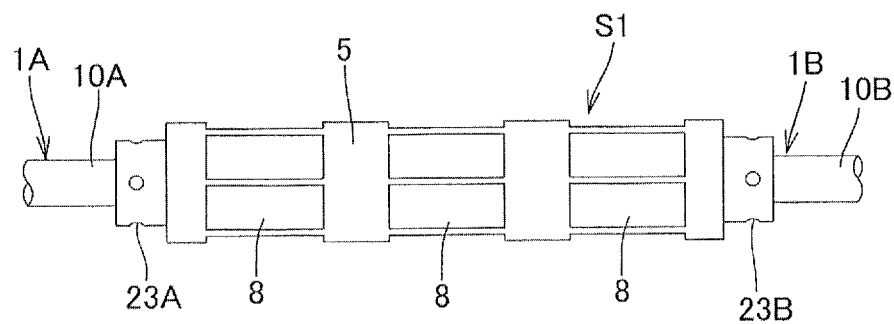

[Fig. 8]
(a)
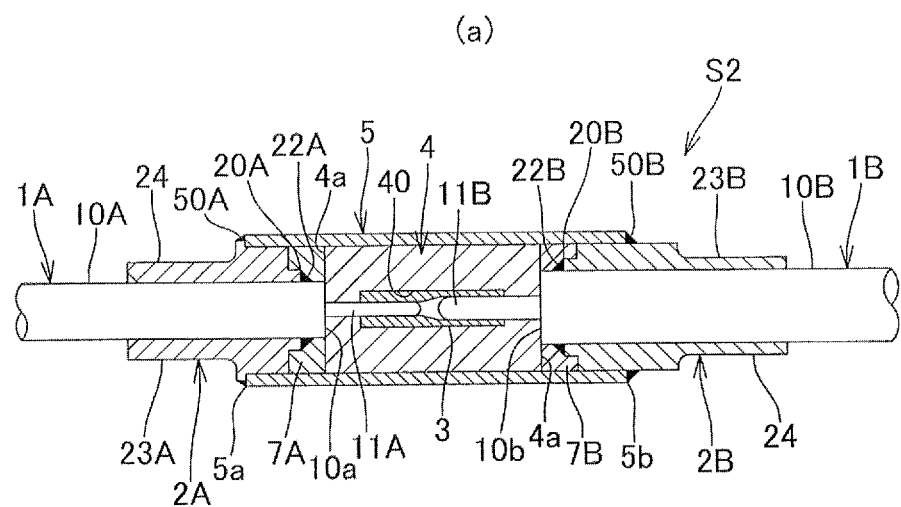
(b)
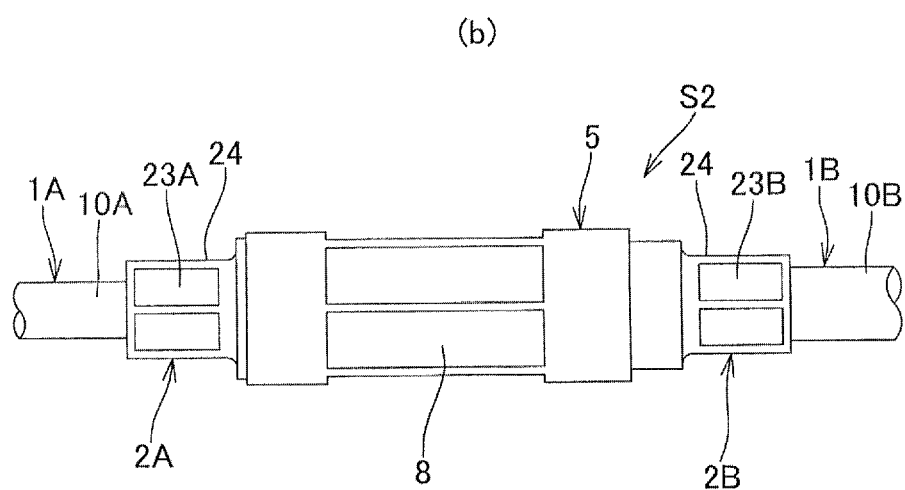

SHEATH STRUCTURE ASSEMBLY COUPLING METHOD

BACKGROUND OF THE INVENTION

Field of the Invention

The present invention relates to a sheath type heater or a sheath type temperature measuring sensor for performing heating or temperature measurement of fluid, solid and the like in various situations such as in piping, under the ground, or with a vacuum device. More specifically, the present invention relates to a coupling structure and a coupling method of a sheath structure assembly for coupling a plurality of sheath type heaters or sheath type temperature measuring sensors to one another in the axial direction, so as to extend the length.

Description of the Background Art

As the coupling structure of this kind, for example, the following coupling structure is proposed. A sheath type heater coupling structure includes: a tubular metal connector into which a heating wire projecting from a metal sheath end on the heating side and a non-heating wire projecting from a metal sheath end on the non-heating side are inserted; a coupling sleeve externally attached between the metal sheath ends; and a heat resistant insulator being interposed between the connector and the coupling sleeve. The opposite end portions of the coupling sleeve are fixed to the outer circumferential surfaces of the metal sheath ends through welding or brazing. Thereafter, the coupling sleeve is pressurized and deformed in the radially inward direction, to compress the heat resistant insulator. Thus, the connector is pressurized in the radially inward direction, so as to attach to the heating wire and the non-heating wire under pressure (see Japanese Unexamined Patent Application No. 2007-220325).

In connection with such a coupling structure, since it is not the structure in which the heating wire and the non-heating wire are abutted on each other and subjected to welding or silver brazing, but the structure in which the wires are attached on the metal connector under pressure to establish electrical connection, the length of the wires can be set relatively freely. Thus, the following effects are exhibited: an improvement in flexibility and a reduction in the cost of the coupling work can be achieved; a reduction in the strength of the connection portion and a reduction in the electrical connection attributed to thinning or a hollow can be avoided; and a uniform and excellent electrical connection can be obtained. Further, it is the structure in which the heat resistant insulator is interposed between the connector and the coupling sleeve, and the coupling sleeve is pressurized and deformed in the radially inward direction, whereby the heat resistant insulator is compressed and the connector is simultaneously pressurized in the radially inward direction, so as to be attached to the heating wire and the non-heating wire under pressure. Therefore, the following effects can also be exhibited: joining of the wires and compression of the insulator can simultaneously be performed efficiently; the heat resistant insulator can easily obtain the uniform high packing density similarly to that of the insulating powder in the metal sheath of the heating portion; and break or a reduction in insulating performance attributed to usage can be prevented.

However, for example, in the case where the coupling structure is used as being arranged in piping, under the ground, or in a structure extending over the distance as great as several thousand meters or more, or in the case where a fluid whose flow velocity or viscosity is very great or a solid with great vibration is subjected to heating or temperature measurement, a great force such as tension, compression, twist, or shock continuously occurs at the coupling portion. In particular, durability of the welded portions between the coupling sleeve opposite end portions and the metal sheath outer circumferential surface may be impaired. Provided that the welded portions are impaired, sealability will be reduced even if damage or break does not occur. This invites a reduction in insulating performance attributed to intrusion of humidity.

Accordingly, in consideration of the circumstances described above, the present invention is directed to provide a sheath structure assembly coupling structure and a sheath structure assembly coupling method, which exhibit excellent workability, achieve a reduction in costs, and avoid a reduction in the strength of the connection portion or in the electrical connection. Further, such coupling structure and coupling method can achieve uniform and excellent electrical connection, maintain excellent durability for a long period and prevent break or a reduction in insulating performance even in the usage environment where a great force such as tension continuously acts.

SUMMARY OF THE INVENTION

In order to solve the problems described above, the present invention provides a sheath structure assembly coupling structure for coupling a first sheath structure assembly and a second sheath structure assembly to each other, the first sheath structure assembly and the second sheath structure assembly each having at least one heater-use and/or temperature measuring sensor-use metal wire stored in a metal sheath and a heat resistant insulator packed in gaps, including:

at least one metal connector having opening portions on opposite ends into which a metal wire projecting from an end of the metal sheath of the first sheath structure assembly and a metal wire projecting from an end of the metal sheath of the second sheath structure assembly are inserted;

a heat resistant insulating member having at least one through hole into which the connector is inserted;

a metal-made first connecting sleeve arranged to cover an outer circumferential surface of the metal sheath of the first sheath structure assembly;

a metal-made second connecting sleeve arranged to cover an outer circumferential surface of the metal sheath of the second sheath structure assembly; and a metal coupling sleeve that is externally attached to the first connecting sleeve, the heat resistant insulating member and the second connecting sleeve, opposite end portions of the coupling sleeve each being welded on an outer circumferential surface of the first connecting sleeve and an outer circumferential surface of the second connecting sleeve, wherein by the coupling sleeve being pressurized and deformed in a radially inward direction, the at least one connector is also deformed in the radially inward direction via the heat resistant insulating member, whereby the connector is attached under pressure to the metal wire of the first sheath structure assembly and the metal wire of the second sheath structure assembly inserted therein to establish an electrical connection, and by the coupling sleeve being pressurized and deformed in the radially inward direction, the first and second connecting sleeves are at least partially deformed in the radially inward direction to closely attach onto the outer circumferential surfaces of the metal sheaths.

Here, preferably, the opposite end portions of the coupling sleeve are each welded to a midway portion in an axial direction on the outer circumferential surface of the first connecting sleeve and to a midway portion in the axial direction on the outer circumferential surface of the second connecting sleeve.

Further, it is preferable that one end portion of the first connecting sleeve is welded to a position on the outer circumferential surface of the metal sheath of the first sheath structure assembly, the position being within a prescribed range from an end face of the metal sheath of the first sheath structure assembly, and one end portion of the second connecting sleeve is welded to a position on the outer circumferential surface of the metal sheath of the second sheath structure assembly, the position being within a prescribed range from an end face of the metal sheath of the second sheath structure assembly.

In particular, it is preferable that the first connecting sleeve is fixed on the outer circumferential surface of the metal sheath of the first sheath structure assembly by swaging at a position toward other end portion of the first connecting sleeve, and the second connecting sleeve is fixed on the outer circumferential surface of the metal sheath of the second sheath structure assembly by swaging at a position toward other end portion of the second connecting sleeve.

Further, it is preferable that, by the coupling sleeve being deformed by being pressurized in the radially inward direction, the coupling sleeve has its outer diameter size reduced to be substantially identical to an outer diameter size of one of the first connecting sleeve and the second connecting sleeve before being pressurized.

Further, it is preferable that the heat resistant insulating member is a tubular compact formed by heat resistant insulating powder being compression molded, and the heat resistant insulating member has at least one through hole into which the connector is inserted in the axial direction.

Further, it is preferable that, in the coupling sleeve, gaps are each formed between the end face of the metal sheath of the first sheath structure assembly and an end face of the heat resistant insulating member, and between the end face of the metal sheath of the second sheath structure assembly and an end face of the heat resistant insulating member, the gaps being packed with the particulate heat resistant insulator.

In particular, it is preferable that the coupling sleeve is made of double inner and outer sleeves, and the outer sleeve is arranged to cover the inner sleeve in a state where:

packing holes for packing the heat resistant insulator into the two gaps are each formed at positions at an outer circumferential wall of the inner sleeve corresponding to the two gaps; and the gaps are packed with the heat resistant insulator from the packing holes.

Further, it is preferable that one end portion of one of the first and second connecting sleeves is welded to a prescribed position that is on the outer circumferential surface of the metal sheath of one of the first and second sheath structure assemblies and that is away from an end face of the metal sheath, and a tubular spacer member is provided between the one end portion of the connecting sleeve welded on the outer circumferential surface of the metal sheath and the end face of the metal sheath.

The present invention also provides a sheath structure assembly coupling method for coupling a first sheath structure assembly and a second sheath structure assembly to each other, the first sheath structure assembly and the second sheath structure assembly each having at least one heater-use and/or temperature measuring sensor-use metal wire stored in a metal sheath and a heat resistant insulator packed in gaps, comprising the steps of preparing:

at least one metal connector having opening portions on opposite ends into which a metal wire projecting from an end of the metal sheath of the first sheath structure assembly and a metal wire projecting from an end of the metal sheath of the second sheath structure assembly are inserted;

a heat resistant insulating member having at least one through hole into which the connector is inserted;

a metal-made first connecting sleeve arranged to cover an outer circumferential surface of the metal sheath of the first sheath structure assembly;

a metal-made second connecting sleeve arranged to cover an outer circumferential surface of the metal sheath of the second sheath structure assembly; and a metal coupling sleeve that is externally attached to the first connecting sleeve, the heat resistant insulating member, and the second connecting sleeve, opposite end portions of the coupling sleeve each being welded on an outer circumferential surface of the first connecting sleeve and an outer circumferential surface of the second connecting sleeve, the method further comprising the steps of:

arranging the first connecting sleeve and the second connecting sleeve to respectively cover the outer circumferential surface of the metal sheath of the first sheath structure assembly and the outer circumferential surface of the metal sheath of the second sheath structure assembly;

inserting the at least one metal wire projecting from the metal sheath end of one of the first sheath structure assembly and the second sheath structure assembly to the connector;

inserting the connector into the heat resistant insulating member; inserting the at least one metal wire projecting from the metal sheath end of other one of the first sheath structure assembly and the second sheath structure assembly to the connector;

externally attaching the coupling sleeve to the first connecting sleeve, the heat resistant insulating member, and the second connecting sleeve;

welding opposite end portions of the coupling sleeve each on the outer circumferential surface of the first connecting sleeve and the outer circumferential surface of the second connecting sleeve; and pressurizing and deforming the coupling sleeve in a radially inward direction, whereby the at least one connector is also deformed in the radially inward direction via the heat resistant insulating member, and the connector is attached under pressure to the metal wire of the first sheath structure assembly and the metal wire of the second sheath structure assembly inserted therein to establish an electrical connection; and by the pressurization and deformation of the coupling sleeve, the first and second connecting sleeves are at least partially deformed in the radially inward direction to closely attach onto the outer circumferential surface of the metal sheath.

Here, it is preferable that the opposite end portions of the coupling sleeve are each welded to a midway portion in an axial direction on the outer circumferential surface of the first connecting sleeve and to a midway portion in the axial direction on the outer circumferential surface of the second connecting sleeve.

Further, it is preferable that one end portion of the first connecting sleeve and one end portion of the second connecting sleeve are respectively welded to: a position on the outer circumferential surface of the metal sheath of the first sheath structure assembly, the position being within a prescribed range from an end face of the metal sheath of the first sheath structure assembly; and a position on the outer circumferential surface of the metal sheath of the second sheath structure assembly, the position being within a prescribed range from an end face of the metal sheath of the second sheath structure assembly.

In particular, it is preferable that the first connecting sleeve is fixed on the outer circumferential surface of the metal sheath of the first sheath structure assembly by swaging at a position toward other end portion, and the second connecting sleeve is fixed on the outer circumferential surface of the metal sheath of the second sheath structure assembly by swaging at a position toward other end portion.

Further, it is preferable that the coupling sleeve is pressurized and deformed in the radially inward direction, such that an outer diameter size of the coupling sleeve is reduced to be substantially identical to an outer diameter size of one of the first connecting sleeve and the second connecting sleeve before being pressurized.

Further, it is preferable that, in the coupling sleeve, the gaps are each formed between the end face of the metal sheath of the first sheath structure assembly and an end face of the heat resistant insulating member, and between the end face of the metal sheath of the second sheath structure assembly and an end face of the heat resistant insulating member, the gaps being packed with the particulate heat resistant insulator.

Preferably, the coupling sleeve is made of double inner and outer sleeves, packing holes for packing the heat resistant insulator into the two gaps are each formed at positions at an outer circumferential wall of the inner sleeve corresponding to the two gaps, and the gaps are packed with the heat resistant insulator from the packing holes, and thereafter the outer sleeve is arranged to cover the inner sleeve.

Further, it is preferable that one end portion of one of the first and second connecting sleeves is welded to a prescribed position that is on the outer circumferential surface of the metal sheath of one of the first and second sheath structure assemblies and that is away from an end face of the metal sheath, and a tubular spacer member is provided between the one end portion of the connecting sleeve welded on the outer circumferential surface of the metal sheath and the end face of the metal sheath.

According to the present invention described above, since the metal wires are electrically connected via the connector, the length of the wires can be set relatively freely. Thus, flexibility and a reduction in cost of the manufacturing process can be achieved. Also, a reduction in the strength of the connection portion or a reduction in the electrical connection attributed to thinning or a hollow can be prevented, and a uniform and preferable electrical connection can be obtained. Further, joining of the wires and compression of the insulator can simultaneously be performed efficiently.

Further, in addition to the foregoing effects, since the opposite end portions of the coupling sleeve are not directly welded to the metal sheath set to the minimum required thickness which is optimum in terms of the function as a heater or a temperature measuring sensor in the present invention, but the end portion of the coupling sleeve whose thickness has high degree of freedom is welded to the outer circumferential surface of the connecting sleeve whose thickness has high degree of freedom. Thus, while a reduction in the strength of the metal sheath, failure, and puncture by welding are avoided, the coupling sleeve can strongly be welded. Further, the joining strength can significantly be improved. Still further, even in the environment where a great force such as tension or compression continuously acts, excellent durability can be maintained and the sealability of the welded portion can also be maintained.

Still further, since the connecting sleeve is interposed between the metal sheath and the coupling sleeve, even when a great force continuously acts from the metal sheath, the force will not act or concentrate to the welded portion of the coupling sleeve, and the connecting sleeve absorbs/buffers the force. Therefore, the structure with which the possibility of occurrence of damage or failure at the welded portion can significantly be reduced can be obtained.

Still further, by the coupling sleeve being pressurized and deformed in the radial direction, the coupling sleeve is attached under pressure to the metal sheath outer circumferential surface not directly but via the connecting sleeve. Accordingly, the connecting sleeve similarly deforms in the radial direction, and functions as a packing between the coupling sleeve and the metal sheath. This improves sealability, and the applied force can be increased as compared to that with the structure in which the force is directly applied to the metal sheath. Hence, what is obtained is the structure with which the sealability can significantly be increased. Further, even when the connecting sleeve deforms because of a great force acting from the metal sheath, the entire closely attaching face between the connecting sleeve and the coupling sleeve receives the force, and the concentration of the force to the welded portion is avoided. Thus, damage or failure can be avoided.

Still further, by the pressurization and deformation of the coupling sleeve, while the coupling sleeve is expanded to shift in the axial direction, the end portion thereof is not welded to the outer circumferential surface of the metal sheath but is welded to the connecting sleeve. Accordingly, the connecting sleeve integrally shifts with the coupling sleeve end portion, which contributes toward avoiding concentration of an excessive force locally to the metal sheath in the axial direction.

Still further, as compared to the structure in which the coupling sleeve is directly welded to the metal sheath, the inner diameter of the coupling sleeve can be increased by the thickness of the connecting sleeve. Therefore, the volume inside the coupling sleeve is increased. This makes it possible to establish a connection with an adequate distance between the metal wires even in the case where the sheath structure assemblies each storing relatively great number of metal wires are to be coupled to each other. Accordingly, electrical insulation can be secured. Thus, the application range becomes wider and workability becomes excellent.

Further, the opposite end portions of the coupling sleeve are each welded to the midway portion in the axial direction on the outer circumferential surface of the first connecting sleeve and to the midway portion in the axial direction on the outer circumferential surface of the second connecting sleeve. Therefore, even when a great force such as tension, compression, twist, and shock is continuously applied via the metal sheath, such a force can be absorbed and buffered by deformation of the region outer than the welded position of the connecting sleeve in the axial direction, i.e., the region where the coupling sleeve is not present. Thus, the effect of the force to the welded portion can be weakened to thereby contribute toward maintenance of durability.

Still further, one end portion of the first connecting sleeve is welded to the position on the outer circumferential surface of the metal sheath of the first sheath structure assembly, the position being within a prescribed range from the end face of the metal sheath of the first sheath structure assembly, and one end portion of the second connecting sleeve is welded to the position on the outer circumferential surface of the metal sheath of the second sheath structure assembly, the position being within a prescribed range from the end face of the metal sheath of the second sheath structure assembly. Accordingly, the welding surely seals between the connecting sleeve and the metal sheath. Even when a force such as tension, compression, twist, or shock acts to the one end portion via the metal sheath, such action is absorbed or buffered by the deformation on the other end portion side. Thus, the structure with excellent durability can be achieved. Further, by employing the position that is on the outer circumferential surface of the metal sheath and that is within a prescribed range from the end face of the metal sheath, strong welding can be performed to the portion near the end face where relatively great strength is required. Similarly to the welding of the coupling sleeve opposite end portions, even when a great force such as tension, compression, twist, or shock continuously acts to the welded portion, excellent durability is maintained. Also, excellent sealability can also be maintained. Further, since the welding is performed on the position on the inner side of the coupling sleeve, the structure is little influenced even if any failure occurs to the sheath, provided that the failure occurs on the metal sheath end face side relative to the welded portion. Still further, workability is also improved.

Still further, the first connecting sleeve is fixed on the outer circumferential surface of the metal sheath of the first sheath structure assembly by swaging at a position toward other end portion, and the second connecting sleeve is fixed on the outer circumferential surface of the metal sheath of the second sheath structure assembly by swaging at a position toward the other end portion. Therefore, tentative attachment can easily be achieved without putting any burden on the metal sheath. Employing such tentative attachment as the alignment in performing welding of the one end portion, workability can be improved.

Still further, by the coupling sleeve being deformed by being pressurized in the radially inward direction, the coupling sleeve has its outer diameter size reduced to be substantially identical to an outer diameter size of one of the first connecting sleeve and the second connecting sleeve before being pressurized. Therefore, the unevenness between the coupling sleeve and the connecting sleeve is substantially eliminated. Thus, it becomes possible to avoid occurrence of any trouble such as the structure being stuck inside piping and hindering the work, when the structure is installed in the piping.

The heat resistant insulating member is a tubular compact formed by heat resistant insulating powder being compression molded, and the heat resistant insulating member has at least one through hole into which the connector is inserted in the axial direction. Therefore, as compared to the structure into which powder is packed at the time of assembling, uniform packing density can be achieved, and electrical insulation can more surely be established. Also, the distance between the metal wires can surely be maintained. Further, since what is need is solely the attachment work, the manufacturing cost can be suppressed.

In the coupling sleeve, the gaps are each formed between the end face of the metal sheath of the first sheath structure assembly and the end face of the heat resistant insulating member, and between the end face of the metal sheath of the second sheath structure assembly and the end face of the heat resistant insulating member. The gaps are packed with the particulate heat resistant insulator. Therefore, in the case where the sheath structure assemblies each having relatively great number of metal wires are coupled to each other, it is necessary to widen the interval between each one of the metal wires and set the metal wires to the heat resistant insulating member. The widened portion becomes a gap not being inserted into the heat resistant insulating member. By packing the gap with the particulate heat resistant insulator, the heat resistant insulating member expands in the axial direction when being pressurized and deformed, and the heat resistant insulator packed in the gap can be compressed to achieve high density.

Still further, the coupling sleeve is made of double inner and outer sleeves, and the outer sleeve is arranged to cover the inner sleeve in the state where: packing holes for packing the heat resistant insulator into the two gaps are each formed at positions at the outer circumferential wall of the inner sleeve corresponding to the two gaps; and the gaps are packed with heat resistant insulator from the packing holes. Therefore, after the heat resistant insulator is packed into the gaps from the packing holes of the inner sleeve, the outer sleeve is attached to close the packing holes. Thus, the coupling strength as a whole can be maintained. Hence, the structure with which excellent work efficiency can be exhibited and which is durable can be implemented.

Still further, one end portion of one of the first and second connecting sleeves is welded to a prescribed position that is on the outer circumferential surface of the metal sheath of one of the first and second sheath structure assemblies and that is away from the end face of the metal sheath, and a tubular spacer member is provided between the one end portion of the connecting sleeve welded on the outer circumferential surface of the metal sheath and the end face of the metal sheath. Therefore, it becomes possible to previously place the spacer before packing to eliminate the space in which the packed heat resistant insulator is difficult to be compressed under pressure later on, such as the space between the welded portion of the connecting sleeve and the metal sheath and the inner circumferential surface of the coupling sleeve, to thereby form a columnar gap between the spacer and the heat resistant insulating member. Thus, after the gaps are filled with the heat resistant insulator, pressurized compression can uniformly be performed to every corner.

BRIEF DESCRIPTION OF THE DRAWINGS

FIG. 1 is a vertical cross-sectional view showing the assembling state of a coupling structure of a sheath structure assembly according to a first embodiment of the present invention before pressurization and deformation;

FIG. 2 is a vertical cross-sectional view showing the coupling structure of the completed sheath structure assembly according to the first embodiment of the present invention after pressurization and deformation;

FIG. 3 is an explanatory view showing the coupling procedure of the coupling structure of the sheath structure assembly according to the first embodiment of the present invention;

FIG. 4 is an explanatory view showing the coupling procedure of the coupling structure of the sheath structure assembly according to the first embodiment of the present invention;

FIG. 5 is an explanatory view showing the coupling procedure of a coupling structure of a sheath structure assembly according to a second embodiment of the present invention;

FIG. 6 is an explanatory view showing the coupling procedure of the coupling structure of the sheath structure assembly according to the second embodiment of the present invention;

FIG. 7 is an explanatory view showing the coupling procedure of the coupling structure of the sheath structure assembly according to the second embodiment of the present invention;

FIG. 8*a* is a vertical cross-sectional view showing the assembling state of a coupling structure of a sheath structure assembly according to a third embodiment of the present invention before pressurization and deformation; and FIG. 8*b* is a side view showing the coupling structure of the completed coupling structure of the sheath structure assembly according to the third embodiment of the present invention after pressurization and deformation.

DESCRIPTION OF THE PREFERRED EMBODIMENTS

Firstly, with reference to FIGS. 1 to 4, a description will be given of a first embodiment of the present invention.

As shown in FIG. 1, a sheath structure assembly coupling structure S according to the present embodiment is structured such that a first sheath structure assembly 1A and a second sheath structure assembly 1B are coupled to each other at their respective end portions in the axial direction. The first sheath structure assembly 1A has at least one heater-use and/or temperature measuring sensor use metal wire 11A stored in a metal sheath 10A and has a heat resistant insulator packed in a gap. Similarly, the second sheath structure assembly 1B has at least one heater-use and/or temperature measuring sensor-use metal wire 11B stored in a metal sheath 10B and has a heat resistant insulator packed in a gap.

Specifically, the coupling structure S includes: at least one connector made of metal 3, the metal wire 11A projecting from the end portion of the metal sheath 10A of the first sheath structure assembly 1A and the metal wire 11B projecting from the end portion of the metal sheath 10B of the second sheath structure assembly 1B, the metal wire 11A and the metal wire 11B each being inserted from opening portions at the opposite ends of the connector 3; a heat resistant insulating member 4 having at least one through hole 40 into which the connector 3 is inserted; a first connecting sleeve made of metal 2A covering the outer circumferential surface of the metal sheath 10A of the first sheath structure assembly 1A; a second connecting sleeve made of metal 2B covering the outer circumferential surface of the metal sheath 10B of the second sheath structure assembly 1B; and a coupling sleeve made of metal 5 externally attached to the first connecting sleeve 2A, the heat resistant insulating member 4, and the second connecting sleeve 2B, opposite end portions 5*a* and 5*b* of the coupling sleeve 5 being welded onto the outer circumferential surface of the first connecting sleeve 2A and the outer circumferential surface of the second connecting sleeve 2B.

Further, the coupling sleeve 5 is pressurized and deformed in the radially inward direction. By the pressurization and deformation, the connector 3 also deforms in the radially inward direction via the heat resistant insulating member 4, and the connector 3 is attached under pressure to the metal wires 11A and 11B inserted therein, to establish an electrical connection. Further, similarly, by the pressurization and deformation of the coupling sleeve 5, at least part of each of the connecting sleeves 2A and 2B deforms in the radially inward direction, to closely attach onto the outer circumferential surface of the metal sheathes 10A and 10B. In this manner, by the coupling sleeve 5 being pressurized in the radially inward direction to be deformed, the coupling sleeve 5 has its diameter reduced to the outer diameter size which is substantially identical to the outer diameter size of the connecting sleeves 2A and 2B before being pressurized.

The sheath structure assemblies 1A and 1B may each be a sheath type heater storing at least one heater-use metal wire or a sheath type temperature measuring sensor storing at least one temperature measuring sensor-use metal wire, or of a hybrid type storing both at least one heater-use metal wire and at least one temperature measuring sensor-use metal wire to heat and measure temperature. Basically, the sheath structure assemblies 1A and 1B to be coupled to each other are identically structured. However, for example, as to the sheath type heaters, it may be the coupling of a heating side sheath structure assembly and a non-heating side sheath structure assembly, the coupling of the heating side sheath structure assemblies, or the coupling of the non-heating side sheath structure assemblies. It is also preferable that one temperature measuring sensor-use metal wire is partially or entirely formed as a hot junction at the coupling structure portion. Hence, as to the metal wires 11A and 11B also, they may each be a heater-use or temperature measuring sensor-use metal wire such as a heating wire or non-heating wire of a heater, or a thermocouple elemental wire, in accordance with the purpose.

Further, as to the metal sheathes 10A and 10B also, any conventionally known sheath type heater or temperature measuring sensor made of stainless steel, for example, can be employed.

The first connecting sleeve 2A has its one end portion 20A welded to the position that is in a prescribed range from the end face 10*a* and that is on the outer circumferential surface of the metal sheath 10A (welded portion 22A), and is fixed onto the outer circumferential surface of the metal sheath 10A by swaging at the position toward the other end portion 21A (swaged portion 23A). Similarly, as to the second connecting sleeve 2B also, one end portion 20B is welded at the position that is in a prescribed range from the end face 10*b* and that is on the outer circumferential surface of the metal sheath 10B (welded portion 22B), and is fixed on the outer circumferential surface of the metal sheath 10B by swaging at the position toward the other end portion 21B (swaged portion 23B). Further, the welded portions 22A and 22B are both welded at the positions close to and leading to the metal sheath end faces 10*a* and 10*b*. Since these positions are the places where the metal sheaths have strength and are less prone to be damaged by the heat at welding, strong welding can be performed.

The opposite end portions 5*a* and 5*b* of the coupling sleeve 5 are respectively welded to the midway portions in the axial direction on the outer circumferential surfaces of the connecting sleeves 2A and 2B (welded portions 50A and 50B). Preferably, regions 24 on the outer side relative to the welded portions 50A and 50B between the connecting sleeves 2A and 2B and the coupling sleeve 5 are not welded to the surfaces of the metal sheathes 10A and 10B, but are fixed by swaging as in the present embodiment, or simply attached under pressure without being fixed. Thus, even when a great force acts to the sheath structure assemblies 1A and 1B, without putting any burden on the metal sheath 10A (10B), the region 24 of the connecting sleeve 2A (2B) will deform whereby the force can be absorbed or alleviated. Further, when the coupling sleeve 5 is pressurized and deformed inwardly in the radial direction also, the connecting sleeves 2A and 2B can relatively shift with the coupling sleeve 5 in the axial direction on the outer circumferential surface of the metal sheathes 10A and 10B freely. Thus, it becomes possible to avoid excessive force from acting or remaining on the metal sheathes 10A and 10B.

The connector 3 is a tubular member having a through hole. The metal wires 11A and 11B are inserted from the respective opposite ends of the through hole. It is to be noted that, it may be structured such that bottomed insert holes are formed from the opposite ends, so that the wires are surely inserted until they abut on the bottom, to thereby improve workability. It is preferable that such a connector 3 is made of metal. In particular, the connector 3 made of nickel or copper is preferable. Further, the heat resistant insulating member 4 is a tubular compact formed by compression molding of heat resistant insulating powder such as MgO, BN and the like, and having at least one through hole 40 through which the connector 3 is inserted in the axial direction. Thus, since it is a compact which should only be assembled, the necessity of packing and compressing the powder as in the conventional manner is eliminated, and easier manufacture is realized. Further, uniform compression density can be obtained.

The connecting sleeves 2A and 2B are cylindrical metal members having inner circumferential surfaces which respectively fit to the outer circumferential surfaces of the metal sheathes 10A and 10B. Further, the coupling sleeve 5 is also a cylindrical metal member having an inner circumferential surface which fits to the outer circumferential surfaces of the connecting sleeves 2A and 2B. In the drawing, the metal sheathes 10A and 10B are identical to each other in the outer diameter size, and the inner diameter of the inner circumferential surface of each of the connecting sleeves 2A and 2B is also identical. However, when the outer diameter of each metal sheath is different, in accordance therewith, the connecting sleeves 2A and 2B of different inner diameter size can be employed. Further, the connecting sleeves 2A and 2B are not necessarily identical to each other in the outer diameter size, and they may be different in size. In this case, the inner diameter of the coupling sleeve may be varied in the axial direction by the size corresponding to the outer diameter size of the connecting sleeves 2A and 2B.

By assembling, a gap is formed between the end face 10a of the metal sheath 10A and one end face 4a of the heat resistant insulating member 4, and between the end face 10b of the metal sheath 10B and the other end face 4b of the heat resistant insulating member 4. In assembling, particulate (preferably, spherical particulate) heat resistant insulator 6 is packed into the gaps. By the coupling sleeve 5 being pressurized and deformed, pressurized compression is achieved, whereby packing density of the insulator 6 is increased. It is preferable to employ the same material for the heat resistant insulator 6 as that packed in the sheath structure assemblies 1A and 1B, and MgO, BN or the like can be employed.

In the following, a description will be given of the procedure of the coupling method according to the first embodiment.

Firstly, as shown in S101 in FIG. 3, from the ends of the metal sheathes 10A and 10B of the sheath structure assemblies 1A and 1B, the metal wires 11A and 11B are exposed, and resin sealing work is performed. The resin sealing portion is not shown in the drawing. Next, as shown in S102 to S103, the first connecting sleeve and the second connecting sleeve are respectively arranged to cover the outer circumferential surface of the metal sheath of the first sheath structure assembly and the outer circumferential surface of the metal sheath of the second sheath structure assembly.

Specifically, firstly, as shown in S102, in the state where the one end portions of the connecting sleeves 2A and 2B are aligned at the prescribed welding positions, the connecting sleeves 2A and 2B are respectively fixed on the outer circumferential surfaces of the metal sheathes 10A and 10B by swaging at the positions toward the other end portions (swaged portions 23A and 23B). Thus, the next welding work is facilitated. Next, as shown in S103, the one end portions of the connecting sleeves 2A and 2B are respectively welded to the positions that are in a prescribed range from the end faces and that are on the outer circumferential surfaces of the metal sheathes 10A and 10B. The welding is performed as welding-all-around to achieve strong welding, whereby sealability avoiding intrusion of humidity from between the connecting sleeve and the metal sheath is secured. In the present embodiment, though welding is performed at the position close to and leading to the end face, welding may be performed at the position being away from the end face as in a second embodiment, which will be described later.

Next, as shown in S104, every metal wire 11A projecting from the end portion of the metal sheath 10A of the first sheath structure assembly 1A is covered by the connector 3. As shown in S105, by inserting the connector 3 into the through hole 40 of the heat resistant insulating member 4, the heat resistant insulating member 4 is attached. Then, as shown in S106 in FIG. 4, every metal wire 11B projecting from the end portion of the other metal sheath 10B is inserted into the connector 3 in the through hole 40 from the other end side of the heat resistant insulating member 4.

Next, as shown similarly in S107 in FIG. 4, while the particulate heat resistant insulator is packed into the gaps between the end faces of the metal sheathes 10A and 10B and the end face of the heat resistant insulating member 4, the coupling sleeve 5 is externally attached to the connecting sleeves 2A and 2B and the heat resistant insulating member 4. Here, it is also preferable to interpose a solid heat resistant insulator compact to each of the positions becoming the gaps at the stage of S104 and S106.

Next, as shown in S108, the opposite end portions 5a and 5b of the coupling sleeve 5 are welded to the midway portion in the axial direction on the outer circumferential surface of the first connecting sleeve 2A and to the midway portion in the axial direction on the outer circumferential surface of the second connecting sleeve 2B (welded portions 50A and 50B). Similarly to the welded portions 22A and 22B, welding is performed as welding-all-around so as to achieve strong welding, whereby sealability avoiding intrusion of humidity from between the coupling sleeve 5 and the connecting sleeves 2A and 2B is secured. It is to be noted that, the coupling sleeve 5 may have its one end portion 5a previously fixed by welding or the like to the outer circumferential surface of the connecting sleeve 2A, before the metal wire 11B projecting from the end portion of the metal sheath 10B is inserted into the connector 3 in the through hole 40 from the other end side of the heat resistant insulating member 4 (at the stage between S105 and S106).

Next, as shown in S109, the coupling sleeve 5 is pressurized and deformed in the radially inward direction. The connector 3 is also deformed in the radially inward direction via the heat resistant insulating member 4, so as to establish an electrical connection by being attached under pressure to the metal wires 11A and 11B. Further, the coupling sleeve 5 has its outer diameter size reduced by being pressurized and deformed to be substantially identical to an outer diameter size of that of the connecting sleeves 2A and 2B before being pressurized. It is to be noted that, though the coupling sleeve 5 is a tubular sleeve having uniform thickness, it is also possible to provide a thick portion and apply pressure as designed by pressing until the outer circumferential surface becomes flat, so as to surely obtain an excellent electrical connection and strength to attachment work under pressure. Further, though the coupling sleeve 5 is pressurized and deformed over the entire length, it may be partially pressurized and deformed as in the second and third embodiments, which will be described later. Further, though the coupling sleeve 5 is pressurized and deformed in the radially inward direction substantially uniformly over the entire circumference, the present invention is not limited thereto, and may be pressurized and deformed by hexagonal swaging as in the second embodiment and a third embodiment. Though the assembling procedure of the first embodiment described above is efficient, it goes without saying that the coupling method of the present invention is not limited thereto.

Next, with reference to FIGS. 5 to 7, a description will be given of the second embodiment of the present invention.

As shown in FIG. 7 which shows the assembling state before pressurization and deformation (the state illustration of S210), in a sheath structure assembly coupling structure Si of the second embodiment, one end portions of the connecting sleeves 2A and 2B are respectively welded to prescribed positions being away from the end faces 10a and 10b on the outer circumferential surfaces of the metal sheathes 10A and 10B (welded portions 22A and 22B). Between the welded connecting sleeve end portions and the metal sheath end faces 10a and 10b, tubular spacer members 7A and 7B are provided. The spacer members may be made of metal or non-metal (ceramics or the like). In the case where the spacer members are made of metal, they can be welded to the connecting sleeve end portions. Thus, workability is improved.

Further, in the present embodiment, the coupling sleeve 5 is made of double inner and outer sleeves (inner sleeve 51 and outer sleeve 52). The outer circumferential wall of the inner sleeve 51 is provided with packing holes 53 and 53 for packing particulate (preferably, spherical particulate) heat resistant insulator in the gaps. After the heat resistant insulator is packed from the packing holes 53 of the inner sleeve 51, the outer sleeve 52 is arranged to cover the inner sleeve 51.

In the following, a description will be given of the procedure of the coupling method according to the second embodiment.

First, as shown in S201 in FIG. 5, the metal wires 11A and 11B are respectively exposed from the ends of the metal sheathes 10A and 10B of the sheath structure assemblies 1A and 1B, to perform resin sealing work. Next, as shown in S202 and S203, the first connecting sleeve 2A and the second connecting sleeve 2B are arranged to respectively cover the outer circumferential surfaces of the metal sheathes 10A and 10B.

Specifically, as shown in S202, in the state where the one end portions of the connecting sleeves 2A and 2B are aligned at the positions being away from the metal sheath end faces 10a and 10b, they are fixed on the outer circumferential surfaces of the metal sheathes 10A and 10B by swaging at the positions toward the other end portions (swaged portions 23A and 23B). Next, as shown in S203, the one end portions of the connecting sleeves 2A and 2B are respectively welded at the positions that is away from the end face and that is on the outer circumferential surfaces of the metal sheathes 10A and 10B (welded portions 22A and 22B). The welding is performed as welding-all-around so as to achieve strong welding.

Next, as shown in S204, the spacer members 7A and 7B are each attached between the one end portions of the connecting sleeves 2A and 2B welded on the outer circumferential surfaces of the metal sheathes 10A and 10B and the metal sheath end faces 10a and 10b. In the state where the spacer members 7A and 7B are attached, the axial direction length of the spacer members 7A and 7B are set such that the end faces of the spacer members 7A and 7B opposite to the connecting sleeve become substantially flush with the metal sheath end faces 10a and 10b. It is preferable that the spacer members 7A and 7B have their end portion inner diameters increased so as to cover the welded portions 22A and 22B of the connecting sleeves 2A and 2B. The spacer members 7A and 7B can be prevented from coming off when the spacer members 7A and 7B are simply attached to the connecting sleeves 2A and 2B through spot welding or the like, whereby the workability in the following process can be improved.

Next, as shown in S205 to S207, every metal wire 11A projecting from the end portion of the metal sheath 10A of the first sheath structure assembly 1A is covered by the connector 3, and every connector 3 is inserted into the through hole 40 of the heat resistant insulating member 4 to thereby attach the heat resistant insulating member 4. Every metal wire 11B projecting from the end portion of the other metal sheath 10B is then inserted into the connector 3 in the through hole 40 from the other end side of the heat resistant insulating member 4.

Next, as shown in S208, the inner sleeve 51 of the coupling sleeve 5 is externally attached to the connecting sleeves 2A and 2B and the heat resistant insulating member 4. Here, the inner sleeve 51 is provided with the packing holes 53. Since the heat resistant insulator can be packed from the packing holes 53 after the external attachment, it is not necessary to perform the external attachment simultaneously with the packing process of the particulate heat resistant insulator into the gaps between the end faces of the metal sheathes 10A and 10B and the end face of the heat resistant insulating member 4. Hence, workability improves. When the opposite end portions of the externally attached inner sleeve 51 are simply attached onto the outer circumferential surfaces of the connecting sleeves 2A and 2B by spot welding or the like, displacement in the axial direction can be avoided, whereby the workability in the following process can be improved (welded portions 54A and 54B).

Next, after the particulate heat resistant insulator is packed into the gaps between the end faces of the metal sheathes 10A and 10B and the end face of the heat resistant insulating member 4 from the packing holes 53, as shown in S209, the outer sleeve 52 of the coupling sleeve 5 is externally attached onto the inner sleeve 51, and the opposite end portions thereof are welded, together with the opposite end portions of the inner sleeve 51, to the midway portion in the axial direction on the outer circumferential surfaces of the connecting sleeves 2A and 2B (welded portions 50A and 50B), as shown in S210. The welding is performed as welding-all-around so as to achieve strong welding, similarly to the welded portions 22A and 22B.

Next, as shown in S211, the coupling sleeve 5 is hexagonally swaged at three places in the axial direction through pressing (hexagonally swaged portions 8), so as to pressurize and deform the coupling sleeve 5 in the radially inward direction, and the connector 3 is also deformed in the radially inward direction via the heat resistant insulating member 4, so as to establish an electrical connection by being attached under pressure to the metal wires 11A and 11B.

The other details of the structure and the procedure and variations are basically the same as in the first embodiment. Therefore, identical reference characters are allotted to the identical structures, and the description thereof are omitted.

Next, with reference to FIG. 8, a description will be given of the third embodiment of the present invention.

As shown in FIG. 8, a sheath structure assembly coupling structure S2 of the third embodiment is structured such that a first single-core sheath structure assembly 1A and a second single-core sheath structure assembly 1B are coupled to each other at their respective end portions in the axial direction. The first single-core sheath structure assembly 1A has only one heater-use and/or temperature measuring sensor-use metal wire 11A stored in a metal sheath 10A and has a heat resistant insulator packed in a gap. Similarly, the second single-core sheath structure assembly 1B has only one heater-use and/or temperature measuring sensor-use metal wire 11B stored in a metal sheath 10B and has a heat resistant insulator packed in a gap.

Specifically, the coupling structure S2 includes: one metal connector 3, the metal wire 11A projecting from the end portion of the metal sheath 10A of the first sheath structure assembly 1A and the metal wire 11B projecting from the end portion of the metal sheath 10B of the second sheath structure assembly 1B, the metal wire 11A and the metal wire 11B each being inserted from opening portions at the opposite ends of the connector 3; a heat resistant insulating member 4 having only one through hole 40 into which the connector 3 is inserted; a first connecting sleeve made of metal 2A covering the outer circumferential surface of the metal sheath 10A of the first sheath structure assembly 1A; a second connecting sleeve made of metal 2B covering the outer circumferential surface of the metal sheath 10B of the second sheath structure assembly 1B; and a coupling sleeve made of metal 5 externally attached to the first connecting sleeve 2A, the heat resistant insulating member 4, and the second connecting sleeve 2B, opposite end portions 5a and 5b of the coupling sleeve 5 being respectively welded onto the outer circumferential surface of the first connecting sleeve 2A and the outer circumferential surface of the second connecting sleeve 2B.

Similarly to the first and second embodiments, the coupling sleeve 5 is pressurized and deformed in the radially inward direction. By the pressurization and deformation, the connector 3 also deforms in the radially inward direction via the heat resistant insulating member 4, and the connector 3 is attached under pressure to the metal wires 11A and 11B inserted therein, to establish an electrical connection. Further, similarly, by the pressurization and deformation of the coupling sleeve 5, the connecting sleeves 2A and 2B at least partially deform in the radially inward direction, to closely attach onto the outer circumferential surfaces of the metal sheathes 10A and 10B.

In the present embodiment, similarly to the second embodiment, the one end portions of the connecting sleeves 2A and 2B are welded to the prescribed positions that are away from the end faces 10a and 10b and that are on the outer circumferential surfaces of the metal sheathes 10A and 10B (welded portions 22A and 22B), and tubular spacer members 7A and 7B are provided between the welded connecting sleeve end portion and the metal sheath end faces 10a and 10b. Further, regions 24 on the outer side relative to the welded portions 50A and 50B between the connecting sleeves 2A and 2B and the coupling sleeve 5 are fixed by hexagonal swaging (swaged portions 23A and 23B).

Further, in the present embodiment, since the sheath structure assemblies 1A and 1B are each of the single-core type, it is not necessary to widen the distance between the exposed metal wires 11A and the distance between the exposed metal wires 11B so as to insert the wires 11A and 11B into the corresponding through hole 40 of the heat resistant insulating member 4 as in the first and second embodiments. Accordingly, there is no gap between the end face 10a of the metal sheath 10A and one end face 4a of the heat resistant insulating member 4, and between the end face 10b of the metal sheath 10B and the other end face 4b of the heat resistant insulating member 4. Hence, packing work of the particulate heat resistant insulator is eliminated.

The procedure of the coupling method according to the third embodiment is basically the same as in the second embodiment until the step of providing the spacer member 7. The procedure after that step can similarly be performed as in the first embodiment except that the step of packing the heat resistant insulator can be eliminated. The coupling sleeve 5 is hexagonally swaged at one place in the axial direction by pressing (hexagonally swaged portion 8), so that the coupling sleeve 5 is pressurized and deformed in the radially inward direction. The connector 3 is also deformed in the radially inward direction via the heat resistant insulating member 4, so as to establish an electrical connection by being attached under pressure to the metal wires 11A and 11B.

The other details of the structure and the procedure and variations are basically the same as in the first or second embodiment. Therefore, identical reference characters are allotted to the identical structures, and the description thereof are omitted.

In the foregoing, though the description has been given of the embodiments of the present invention, the present invention is not limited to the embodiments. It goes without saying that the present invention can be practiced in various modes within a range not departing from the gist of the present invention.

REFERENCE SIGNS LIST

S, S1, S2 Coupling structure
1A, 1B Sheath structure assembly
2A, 2B Connecting sleeve
3 Connector
4 Heat resistant insulating member
4a, 4b End face
5 Coupling sleeve
5a, 5b End portion
6 Heat resistant insulator
7A, 7B Spacer member
8 Hexagonally swaged portion
10A, 10B Metal sheath
10a, 10b End face
11A, 11B Metal wire
20A, 20B End portion
21A, 21B End portion
22A, 22B Welded portion
23A, 23B Swaged portion
24 Region
40 Through hole
50A, 50B Welded portion
51 Inner sleeve
52 Outer sleeve 53 Packing hole
54A, 54B Welded portion

What is claimed is:

1. A sheath structure assembly coupling method for coupling a first sheath structure assembly and a second sheath structure assembly to each other, the first sheath structure assembly and the second sheath structure assembly each having at least one heater-use and/or temperature measuring sensor-use metal wire stored in a metal sheath and a heat resistant insulator packed in gaps, comprising the steps of preparing:
   at least one metal connector having opening portions on opposite ends into which a metal wire projecting from an end of the metal sheath of the first sheath structure assembly and a metal wire projecting from an end of the metal sheath of the second sheath structure assembly are inserted;
   a heat resistant insulating member having at least one through hole into which the connector is inserted;
   a metal-made first connecting sleeve arranged to cover an outer circumferential surface of the metal sheath of the first sheath structure assembly;
   a metal-made second connecting sleeve arranged to cover an outer circumferential surface of the metal sheath of the second sheath structure assembly; and
   a metal coupling sleeve that is externally attached to the first connecting sleeve, the heat resistant insulating member, and the second connecting sleeve, opposite end portions of the coupling sleeve each being welded on an outer circumferential surface of the first connecting sleeve and an outer circumferential surface of the second connecting sleeve, the method further comprising the steps of:
   arranging the first connecting sleeve and the second connecting sleeve to respectively cover the outer circumferential surface of the metal sheath of the first sheath structure assembly and the outer circumferential surface of the metal sheath of the second sheath structure assembly;
   inserting the at least one metal wire projecting from the metal sheath end of one of the first sheath structure assembly and the second sheath structure assembly to the connector;
   inserting the connector into the heat resistant insulating member;
   inserting the at least one metal wire projecting from the metal sheath end of other one of the first sheath structure assembly and the second sheath structure assembly to the connector;
   externally attaching the coupling sleeve to the first connecting sleeve, the heat resistant insulating member, and the second connecting sleeve;
   welding opposite end portions of the coupling sleeve each on the outer circumferential surface of the first connecting sleeve and the outer circumferential surface of the second connecting sleeve; and
   pressurizing and deforming the coupling sleeve in a radially inward direction, whereby the at least one connector is also deformed in the radially inward direction via the heat resistant insulating member, and the connector is attached under pressure to the metal wire of the first sheath structure assembly and the metal wire of the second sheath structure assembly inserted therein to establish an electrical connection; and
   by the pressurization and deformation of the coupling sleeve, the first and second connecting sleeves are at least partially deformed in the radially inward direction to closely attach onto the outer circumferential surface of the metal sheath.

2. The sheath structure assembly coupling method according to claim 1, wherein
   the opposite end portions of the coupling sleeve are each welded to a midway portion in an axial direction on the outer circumferential surface of the first connecting sleeve and to a midway portion in the axial direction on the outer circumferential surface of the second connecting sleeve.

3. The sheath structure assembly coupling method according to one of claims 1 and 2, wherein
   one end portion of the first connecting sleeve and one end portion of the second connecting sleeve are respectively welded to: a position on the outer circumferential surface of the metal sheath of the first sheath structure assembly, the position being within a prescribed range from an end face of the metal sheath of the first sheath structure assembly; and a position on the outer circumferential surface of the metal sheath of the second sheath structure assembly, the position being within a prescribed range from an end face of the metal sheath of the second sheath structure assembly.

4. The sheath structure assembly coupling method according to claim 3, wherein
   the first connecting sleeve is fixed on the outer circumferential surface of the metal sheath of the first sheath structure assembly by swaging at a position toward other end portion, and the second connecting sleeve is fixed on the outer circumferential surface of the metal sheath of the second sheath structure assembly by swaging at a position toward other end portion.

5. The sheath structure assembly coupling method according to claim 1 or 2, wherein
   the coupling sleeve is pressurized and deformed in the radially inward direction, such that an outer diameter size of the coupling sleeve is reduced to be substantially identical to an outer diameter size of one of the first connecting sleeve and the second connecting sleeve before being pressurized.

6. The sheath structure assembly coupling method according to claim 1 or 2, wherein
   in the coupling sleeve, gaps are each formed between the end face of the metal sheath of the first sheath structure assembly and an end face of the heat resistant insulating member, and between the end face of the metal sheath of the second sheath structure assembly and an end face of the heat resistant insulating member, the gaps being packed with particulate heat resistant insulator.

7. The sheath structure assembly coupling method according to claim 6, wherein
   the coupling sleeve is made of double inner and outer sleeves,
   packing holes for packing the heat resistant insulator into the two gaps are each formed at positions at an outer circumferential wall of the inner sleeve corresponding to the two gaps, and
   the gaps are packed with the heat resistant insulator from the packing holes, and thereafter the outer sleeve is arranged to cover the inner sleeve.

8. The sheath structure assembly coupling method according to claim 3, wherein
   one end portion of one of the first and second connecting sleeves is welded to a prescribed position that is on the outer circumferential surface of the metal sheath of one of the first and second sheath structure assemblies and that is away from an end face of the metal sheath, and a tubular spacer member is provided between the one end portion of the connecting sleeve welded on the outer circumferential surface of the metal sheath and the end face of the metal sheath.

* * * * *